(12) United States Patent
Machado et al.

(10) Patent No.: US 8,226,477 B1
(45) Date of Patent: Jul. 24, 2012

(54) AUTOMATIC SIMULATION OF CALL CENTER SCENARIOS

(75) Inventors: Michael Machado, Folsom, CA (US); Markus Hahn, Soquel, CA (US)

(73) Assignee: LiveOps, Inc., Santa Clara, CA (US)

( * ) Notice: Subject to any disclaimer, the term of this patent is extended or adjusted under 35 U.S.C. 154(b) by 1035 days.

(21) Appl. No.: 12/220,260

(22) Filed: Jul. 23, 2008

(51) Int. Cl.
*G06F 17/00* (2006.01)
*A63F 13/00* (2006.01)
*A63F 13/12* (2006.01)
*A63F 9/24* (2006.01)

(52) U.S. Cl. ............ 463/31; 463/29; 463/30; 463/34; 273/108.1; 273/317.1; 273/461; 434/219; 434/222; 434/223; 715/700; 715/706; 715/762; 715/763

(58) Field of Classification Search ........... 463/1, 9–13, 463/16, 20, 25, 29, 40–43, 30–34; 273/108.1, 273/145 R, 147, 141 A, 317.1, 351, 454–456, 273/460–461; 704/E15.047; 709/203–207, 709/216–219, 225, 227, FOR. 106, FOR. 111, 709/FOR. 112, FOR. 115, FOR. 122, FOR. 130, 709/FOR. 131, FOR. 132, FOR. 141, FOR. 148, 709/FOR. 149, FOR. 153; 710/18, 20; 715/200, 715/700, 706, 738, 744, 757–758, 762–764; 340/7.1, 7.2, 7.21, 7.28, 311.2, 426.21, 572.1–572.4, 340/825.29, 825.49; 902/10, 23; 434/219, 434/222–223
See application file for complete search history.

(56) References Cited

U.S. PATENT DOCUMENTS

| | | | | |
|---|---|---|---|---|
| 5,200,901 A * | 4/1993 | Gerstenfeld et al. | .......... | 701/120 |
| 5,544,316 A * | 8/1996 | Carpenter et al. | ............ | 719/310 |
| 5,729,253 A * | 3/1998 | Mashita et al. | ............... | 715/763 |
| 5,923,730 A * | 7/1999 | Takaki | ....................... | 379/15.02 |
| 6,117,178 A * | 9/2000 | Whitney et al. | .................. | 703/12 |
| 6,141,016 A * | 10/2000 | Yuura et al. | .................... | 345/619 |
| 6,272,450 B1 * | 8/2001 | Hill et al. | ......................... | 703/13 |
| 6,385,444 B1 * | 5/2002 | Peschel et al. | ................. | 455/405 |
| 6,657,641 B2 * | 12/2003 | Tachibana et al. | ............ | 715/751 |
| 6,898,188 B1 * | 5/2005 | Hamami | ....................... | 370/252 |
| 7,155,158 B1 * | 12/2006 | Iuppa et al. | .................... | 434/350 |
| 8,065,621 B2 * | 11/2011 | Appel | ........................... | 715/762 |
| 2002/0170953 A1 * | 11/2002 | Claiborne | ..................... | 235/375 |
| 2004/0199369 A1 * | 10/2004 | Freidman et al. | ............... | 703/19 |
| 2004/0224710 A1 * | 11/2004 | Koskelainen et al. | ......... | 455/518 |
| 2004/0249949 A1 * | 12/2004 | Gourraud et al. | ............. | 709/227 |
| 2008/0195471 A1 * | 8/2008 | Dube et al. | ....................... | 705/14 |
| 2009/0035736 A1 * | 2/2009 | Wolpert et al. | ............... | 434/219 |

* cited by examiner

*Primary Examiner* — Arthur O. Hall

(74) *Attorney, Agent, or Firm* — PatentEsque Law Group, LLP

(57) ABSTRACT

An exemplary method for automatically simulating calling scenarios comprises the steps of receiving, from a user, information relating to a call center scenario, automatically obtaining at least one calling scenario template based on the information, automatically merging code modules specific to the scenario with the template to generate a simulation program, executing the simulation program, and providing simulation results to the user.

16 Claims, 7 Drawing Sheets

AUTOMATIC SIMULATION OF CALL CENTER SCENARIOS

BACKGROUND

In a call center, service scenarios can be tested by performing simulations of the scenarios. Simulations may be performed by assigning human agents and callers to test various call handling situations. Simulations involving human agents can be expensive and inefficient. Certain commercially available software products have enabled some call centers to simulate virtual telephones which may be designated as virtual callers in a simulation. However, these simulated calls still may require human agents to complete a simulation. In addition, simulation scenarios are generally designed manually by call center operators.

Thus, it would be beneficial to provide a method and system to automatically simulate call center scenarios.

SUMMARY

An exemplary method for automatically simulating calling scenarios comprises the steps of receiving, from a user, information relating to a call center scenario, automatically obtaining at least one calling scenario template based on the information, automatically merging code modules specific to the scenario with the template to generate a simulation program, executing the simulation program, and providing simulation results to the user.

Other exemplary embodiments and implementations are disclosed herein.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. OVERVIEW

Section II describes an exemplary system for automatically simulating call center scenarios.

Section III describes exemplary processes for automatically simulating call center scenarios.

Section IV describes an exemplary computing environment.

II. AN EXEMPLARY SYSTEM FOR AUTOMATICALLY SIMULATING CALL CENTER SCENARIOS

Figure 1:
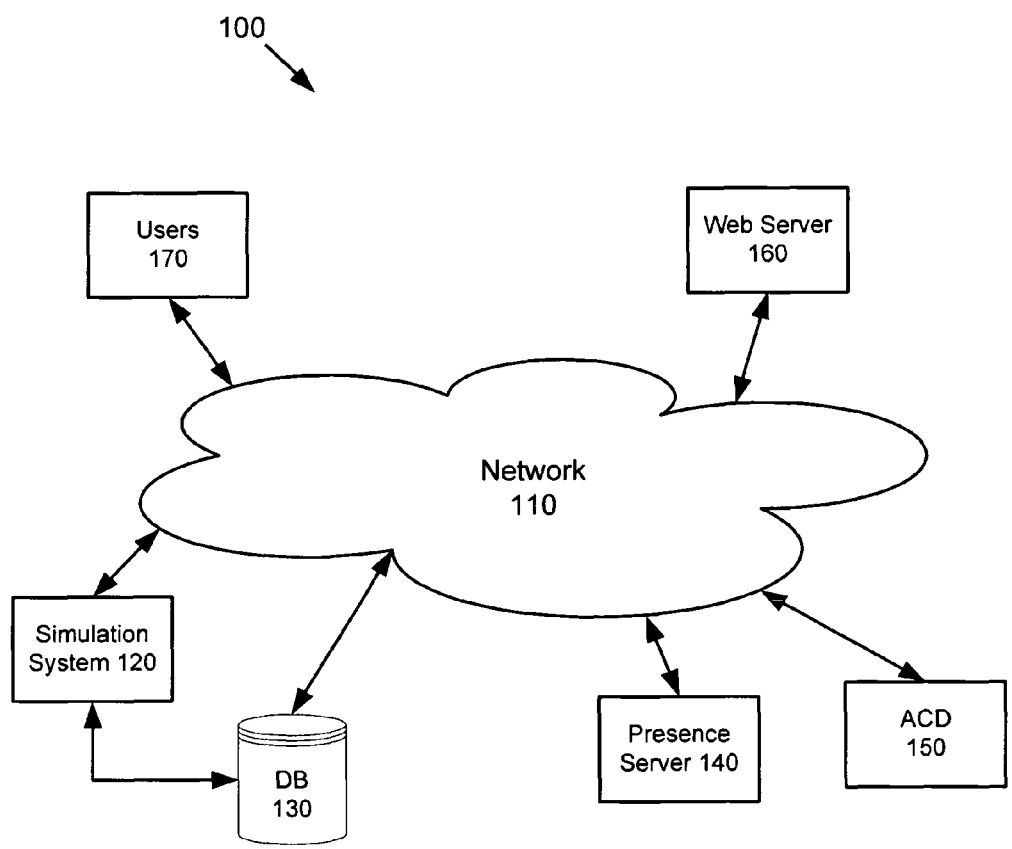
FIG. 1 illustrates an exemplary system for automatically simulating call center scenarios.

FIG. 1 illustrates an exemplary system 100 for automatically simulating call center scenarios. The system 100 includes a simulation system 120, a database 130, a presence server 140, an automatic call director (ACD) 150, and a web server 160. In an exemplary implementation, these components are connected to each other via a communications network 110, such as the Internet. Users 170 may be connected to the network 110 for accessing the simulation system 120 and other call center functions. For ease of explanation purposes, many components are not illustrated. Examples of components not illustrated in FIG. 1 include, without limitation, multiple web servers, agents for handling calls, multiple presence servers, the PSTN, and so forth. One skilled in the art will recognize that these and other components may be readily added to the network 110 for performing call center functions.

The simulation system 120 receives information relating to simulation scenarios from users 170. In an exemplary implementation, the information includes a simulation program which may be executed in the simulation system 120. In another exemplary implementation, the information from a user includes information relating to a simulation scenario (e.g., campaign type, number of agents, number of calls, time of the day for the simulation, duration of the simulation, etc.). In this exemplary implementation, the simulation system 120 automatically generates a simulation program based on the information and existing code modules. An exemplary implementation of the simulation system 120 will be described in more detail below with reference to FIGS. 2, 3, 4, and 5.

In an exemplary implementation, information from users, code modules, simulation results, and/or other data are stored in the database 130. The database 130 may be directly accessible by the simulation system 120 or may be accessible via the network 110, or both.

The presence server 140 maintains and monitors agent presence and availability. For example, agents who are able to take calls may log-in via a web browser and the presence and availability information are updated at the presence server 140. In an exemplary implementation, virtual agents may be logged into the presence server for handling simulated calls from virtual callers during a simulation. The presence server 140 may not be able to distinguish between human agents and virtual agents.

The ACD 150 generally functions to direct calls to different resources within the call center (e.g., an interactive voice response system, an agent, etc.). In an exemplary implementation, the ACD 150 may be implemented as a scriptable call director that is configured to invoke executable software scripts for handling different types of calls (e.g., for different campaigns, programs within campaigns, and/or other types). Different software scripts may cause different computer screens to be displayed to guide agents through calls.

The web server 160 may be a part of the simulation system 120 or may be an independent server. The web server 160 is configured to receive information from users during access of the simulation system 120. Information obtained from the users 170 may be stored in the database 130. In an exemplary implementation, simulation results from the simulation system 120 are provided to the users 170 via the web server 160.

Figure 2:
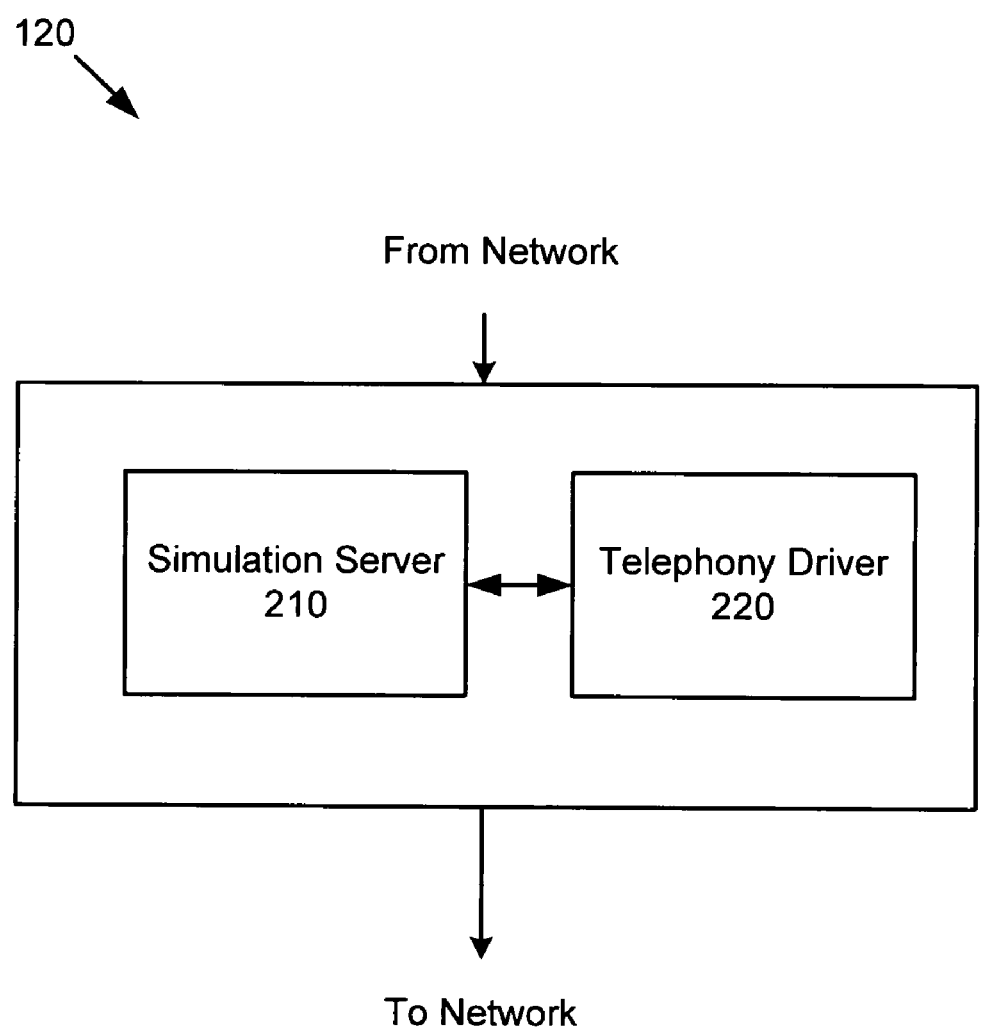
FIG. 2 illustrates an exemplary simulation system.

FIG. 2 illustrates an exemplary simulation system 120. The exemplary simulation system 120 includes a simulation server 210 communicably coupled to a telephony driver 220. The simulation server 210 is configured to execute simulation programs. In an exemplary implementation, the simulation server 210 is further configured to generate simulation programs. An exemplary simulation server 210 is described below with reference to FIG. 3. The telephony driver 220 simulates callers for facilitating a simulation of a call center scenario. An exemplary telephony driver 220 is described below with reference to FIG. 4.

Figure 3:
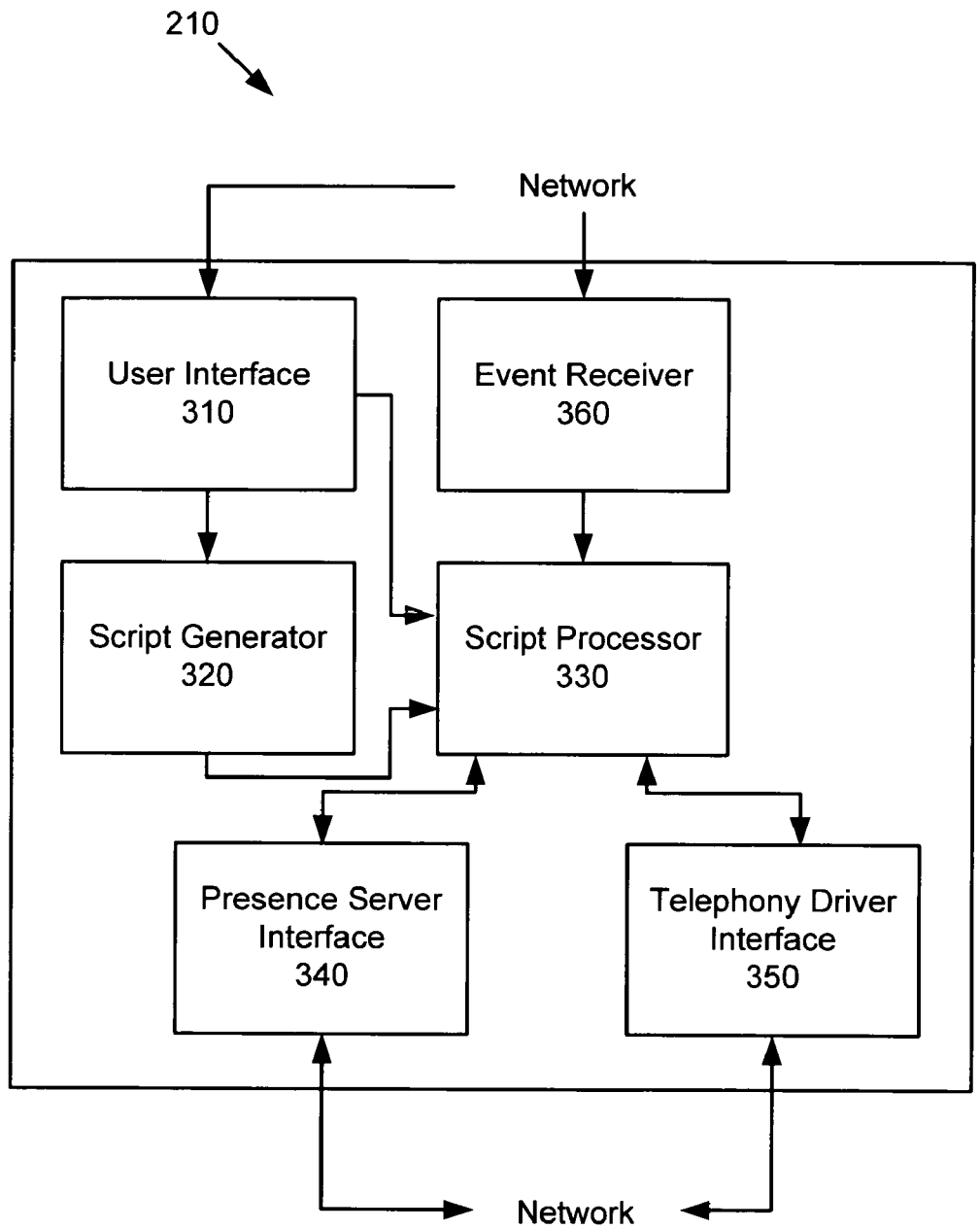
FIG. 3 illustrates an exemplary simulation server.

FIG. 3 illustrates an exemplary simulation server 210. The exemplary simulation server 210 includes a user interface 310, a script generator 320, a script processor 330, a presence server interface 340, a telephony driver interface 350, and an event receiver 360.

The user interface 310 is configured to receive information from users 170 via the network 110 (e.g., through a web server 160). Information may include user identification information (e.g., log-in, account information, etc.), simulation scenario information and/or other information. Simulation scenario information may include one or more of: a type of campaign to be simulated, a number of simulated agents, agent attributes, a number of callers, caller attributes, duration of the simulation, and/or other parameters relevant to any scenario to be simulated. In an exemplary implementation, the information received from a user may include a simulation program executable by the script processor 330.

The script generator 320 includes functionality for automatically obtaining at least one calling scenario template based on the information from the user and automatically merging code modules specific to the scenario with the template to generate a simulation program. An exemplary script generator 320 will be described in more detail below with reference to FIG. 5.

The script processor 330 is configured to execute simulation programs. The simulation programs may be created using any computer executable software languages, such as the JavaScript, XML, and/or other languages. The simulation program may be provided by the user or automatically generated by the script generator 320 based on user provided scenario information. In an exemplary implementation, an instance of an executable unit is invoked by the script processor 330 to facilitate execution of each simulation program.

In an exemplary implementation, when a simulation program is written in JavaScript, software objects may be implemented to facilitate efficient program execution. Software objects may include, without limitation, campaign objects incorporating attributes of different campaigns, agent objects incorporating attributes of different agents, caller objects incorporating attributes of different callers, and so forth. Software object creation and maintenance are well known in the art and need not be described in more detail herein.

In this exemplary implementation, during execution of a simulation program, agent objects representing virtual agents may be invoked. The script processor 330 may virtually log-in the agent objects as virtual agents at the presence server 140 via the presence server interface 340. As far as the presence server 140 is concerned, the agent objects are indistinguishable from human agents and the agent objects are present and available to handle calls for the simulated campaign.

Similarly, during execution of a simulation program, depending on specific program instructions, the script processor 330 may direct the telephony driver 220 to invoke caller objects to simulate virtual callers via the telephony driver interface 350. An exemplary telephony driver 220 will be described in more detail below with reference to FIG. 4.

During simulation of a call center scenario in accordance with a simulation program being executed by the script processor 330, one or more calls may be placed by simulated callers and handled by simulated agents. For example, during a call, a caller object invoked by the telephony driver 220 makes a call using a phone number associated with a simulated campaign. The call is routed to the ACD 150 from the telephony driver 220. The ACD 150 determines the appropriate simulated agent for handling the call. In an exemplary implementation, the phone number associated with the call is used by the ACD 150 to select a simulated agent, assigned to a particular simulated campaign, to handle the call. The ACD 150 routes the call from the simulated caller to the simulated agent through the presence sever 140.

The event receiver 360 monitors events taking place at the ACD 150, the presence server 140, and/or other components involved in a simulation. The events are provided back to the script processor 330. In an exemplary implementation, the events received at the script processor 330 may affect the behavior of one or more of the software objects (e.g., caller objects, agent objects, campaign objects, etc.). For example, a "call failed" event may affect a caller object by causing it to redial the phone number, a "call stop" event may affect an agent object by causing it to reconnect with a call, and so forth. The events may also cause the script processor 330 to terminate execution of the simulation program and send an error message to the user.

Figure 4:
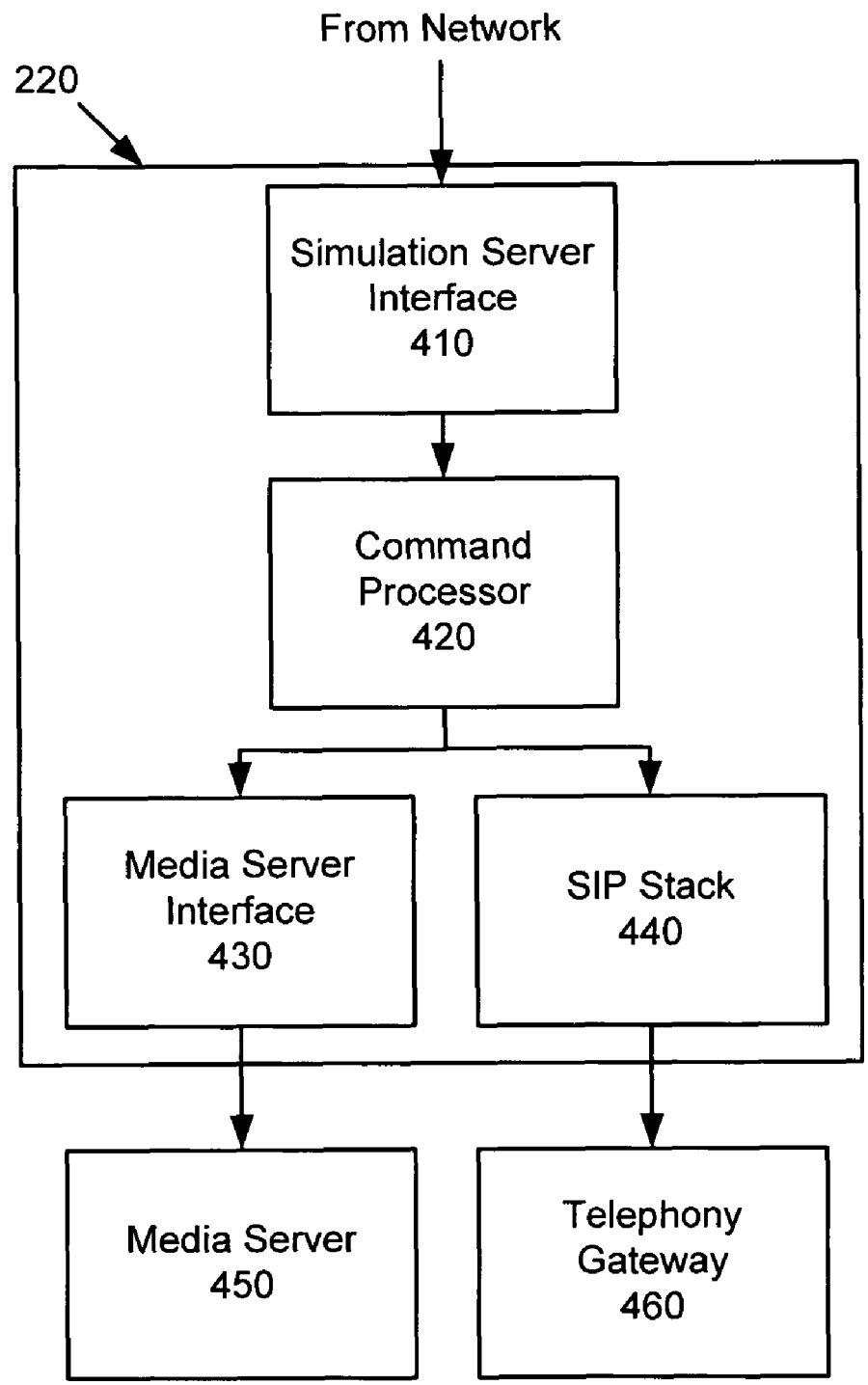
FIG. 4 illustrates an exemplary telephony driver.

FIG. 4 illustrates an exemplary telephony driver 220. The exemplary telephony driver includes a simulation server interface 410, a command processor 420, a media server interface 430, and a SIP (session initiation protocol) stack 440.

The simulation server interface 410 receives commands from the simulation server 210 via the telephony driver interface 350. Commands may include, without limitation, instructions to generate a number of simulated callers (e.g., by invoking a number of caller objects) to simulate a specific call center scenario.

The command processor 420 processes the commands from the simulation server 210 to invoke a number of caller objects in the SIP stack 440. The caller objects may include audio components which may be simulated in the media server 450 via the media server interface 430. Each caller object may be instructed to "dial" a telephone number and the call can be routed via the telephone gateway 460 to the ACD 150 to be handled by a simulated agent. The creation of a SIP stack 440, a media server 450, and a telephony gateway 460 are well known in the art and need not be described in more detail herein.

Figure 5:
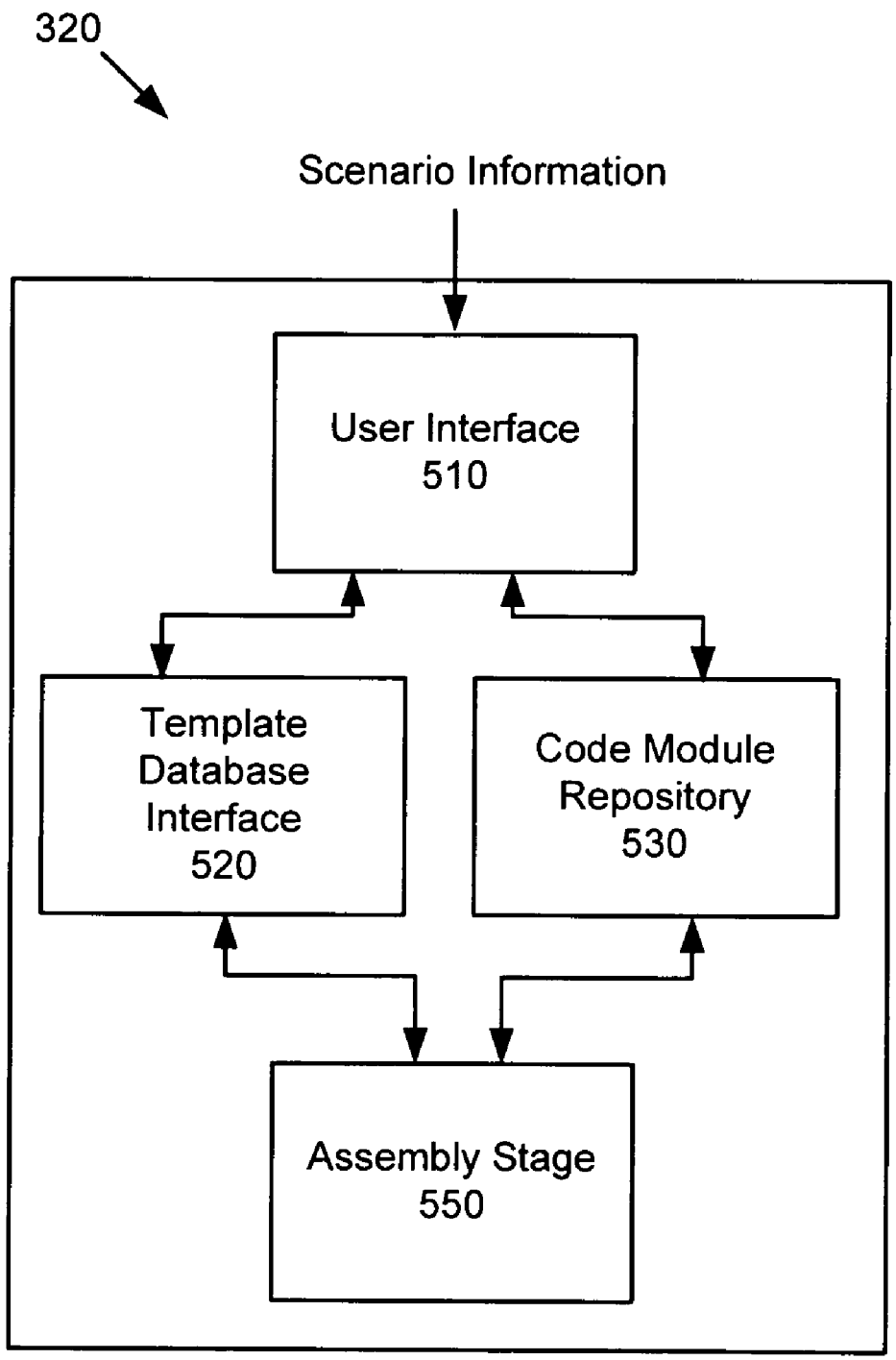
FIG. 5 illustrates an exemplary script engine.

FIG. 5 illustrates an exemplary script generator 320. The exemplary script generator 320 includes a user interface 510, a template database interface 520, a code module repository 530, and an assembly stage 550. In an exemplary implementation, at least some scenario information is obtained from a user via the user interface 510. In another exemplary implementation, other scenario information (e.g., pre-defined agent objects, caller objects, campaign objects, specified numbers of each type of objects, etc.) may be stored in a database 130 and accessible via the template database interface 520. Pre-written executable computer software instructions may be implemented in a scripting language (e.g., JavaScript) as code modules defining certain basic actions (e.g., login, call, verify a connection, repeat, etc.). The code modules may be stored in a database 130 accessible via the code module repository 530.

In an exemplary implementation, a user may customize a simulation by altering the data entered into one or more templates. An example for such customizing information could be structured in XML, for instance:

<setup>
<target type="campaign" name="campaignX"/>
<instance count="1"/>
</setup>

The same format could be used for the template, representing the scenario:

<scenario name="caller_connect_repeat">
<action type="loop">
<action type="consumer_connect"
target="%campaign%"/>
</action>
</scenario>

In this template the actions items 'loop' and 'consumer_connect' represent the assembling rules, pointing to the corresponding code modules. The assembling rules are applied at the assembly stage 550 to generate a customized simulation program executable by the script processor 330.

For example, code modules for specific actions may include executable software instructions for the following actions: 'call campaign X', 'verify to get agent Y', 'hangup' and 'repeat process.' These instructions chunks in combination form the 'consumer_connect' action and can be represented by the following three expressions:

consumer1.call(%target%);
agent1.waitForCall( );
consumer1.disconnect( );

and one with placeholders

//:LABEL {label}
{block}
//:JUMP {label}

In the assembly stage 550, assembling rules defined in the scenario template can be applied to put together the pieces to generate a simulation program "dyn8391" comprising:

//:LABEL dyn8391
consumer1.call(campaignX);
agent1.waitForCall( );
consumer1.disconnect( );
//:JUMP dyn8391

The 0 placeholders are replaced with the appropriate information (i.e., the 'consumer_connect' action). As illustrated above, information from the user can be applied to a scenario template to shape the generated simulation program. In this example, the 'campaignX' provided by the user is incorporated in the code of the simulation program.

III. EXEMPLARY PROCESSES FOR AUTOMATICALLY SIMULATING CALL CENTER SCENARIOS

Figure 6:
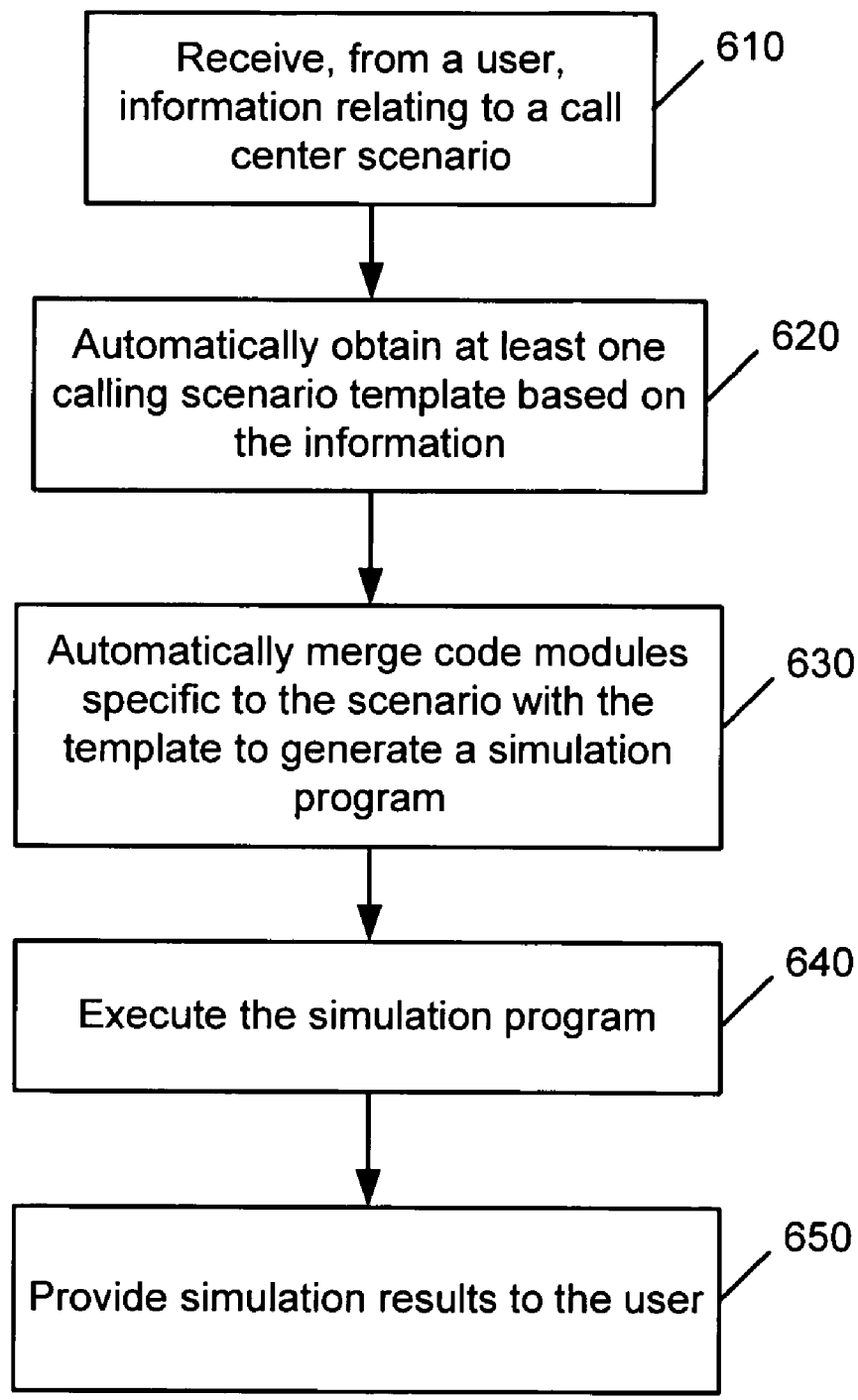
FIG. 6 illustrates an exemplary process for automatically simulating call center scenarios.

FIG. 6 illustrates an exemplary process for automatically simulating call center scenarios.

At step 610, a simulation system 120 receives, from a user, information relating to a simulation of a call center scenario. In an exemplary implementation, the information is received via a web server 160. Information may include a simulation program or customized data useable for automatically generating a simulation program.

At step 620, the simulation system 120 automatically obtains at least one calling scenario template based on the received information. In an exemplary implementation, the simulation system 120 obtains a template which can be populated with the user specified data.

At step 630, the simulation system 120 automatically merges code modules specific to the scenario with the template to generate a program. In an exemplary implementation, the code modules include chunks of executable software instructions pre-defined for specific actions.

At step 640, the simulation system 120 executes the simulation program. In an exemplary implementation, the simulation 120 continuously or periodically receives feedback events during execution of the simulation program. The feedback events may or may not alter the simulation process and/or results.

At step 650, the simulation system 120 provides the simulation result so the user. In an exemplary implementation, the results are provided to the user via the web server 160.

Figure 7:
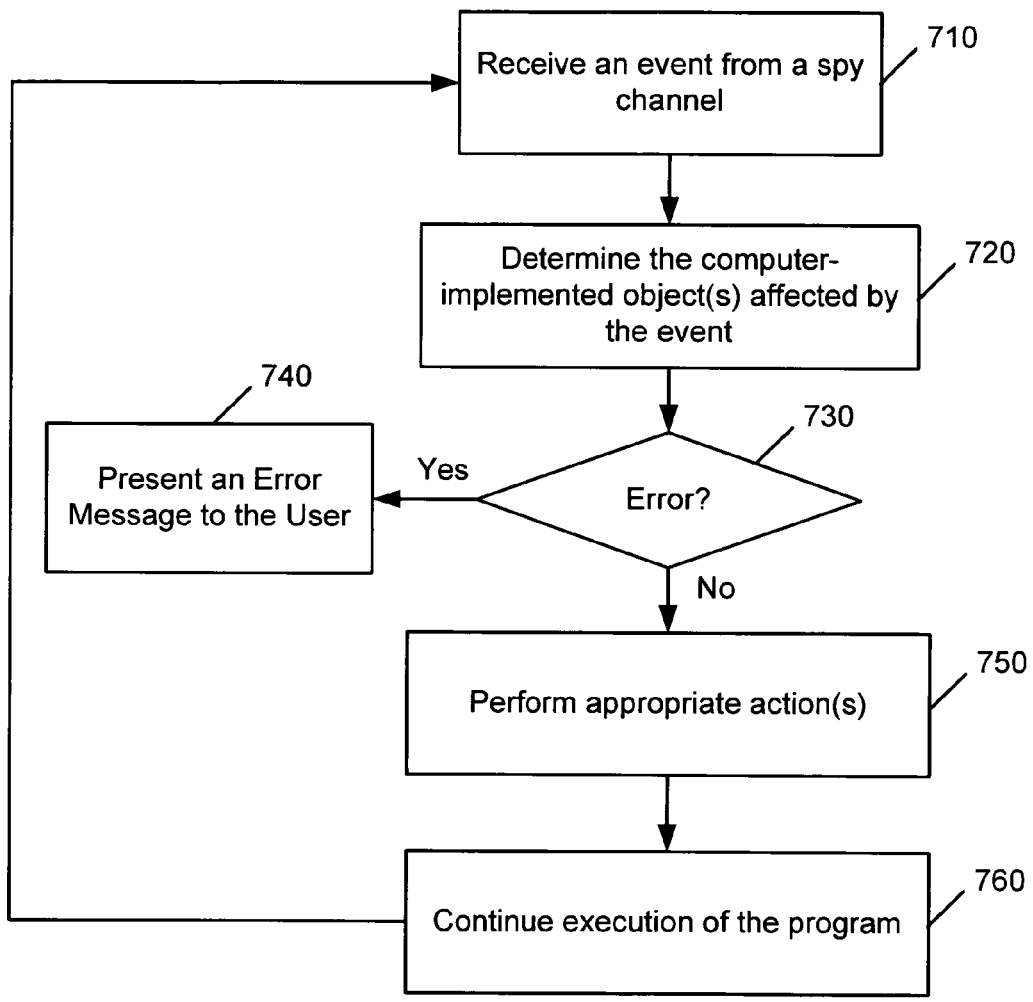
FIG. 7 illustrates an exemplary process for monitoring a simulation.

FIG. 7 illustrates an exemplary process for monitoring a simulation.

At step 710, the event receiver 360 receives an event from a spy channel. The event may be based on an occurrence at the ACD 150, the presence server 140, or any other component relevant to a simulation. The event receiver 360 provides the event to the script processor 330.

At step 720, the script processor 330 determines any software object(s) of the simulation that may be affected by the event.

At step 730, the script processor 330 determines whether the event has caused an error in the simulation.

If so, at step 740, an error message is communicated to the user and the simulation may be terminated.

If no error, at step 750, any appropriate action resulting from the event is performed.

At step 760, the simulation program resumes execution until receipt of the next event.

IV. EXEMPLARY OPERATING ENVIRONMENTS

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware solution contains the requisite processor functionality. The hardware solutions could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

V. CONCLUSION

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A computer-implemented method for automatically simulating calling scenarios, comprising:
   (a) receiving at a simulation server, from a user, information relating to a call center scenario to be simulated, the call center being configured to handle telephone calls from human callers;
   (b) automatically obtaining at least one calling scenario template, from a computer database accessible by the simulation server, based on the information;
   (c) automatically merging code modules specific to the scenario with the template to generate a simulation program by the simulation server, said code modules including one or more chunks of executable computer software instructions defining one or more actions;
   (d) executing the simulation program by a computer processor of the simulation server; and
   (e) providing simulation results based on the simulation program to the user through a user interface.

2. The method of claim 1, wherein said template is pre-existing.

3. The method of claim 1, wherein said template corresponds to said scenario.

4. The method of claim 1, further comprising:
   receiving one or more feedback events;
   determining whether said feedback events affect the execution of the simulation program; and
   modifying said simulation results based on said determining.

5. The method of claim 1, wherein said code modules include computer-executable instructions for performing pre-defined actions.

6. The method of claim 1, wherein said executing includes executing a JavaScript.

7. A simulation system for automatically simulating calling scenarios, comprising:
   a simulation server communicably coupled to a telephony driver; said simulation server including:
   a user interface configured to receive, from a user, information relating to a call center scenario to be simulated, the call center being configured to handle telephone calls from human callers;
   a script generator, communicably coupled to said user interface, configured to automatically obtain at least one calling scenario template based on the information and automatically merge code modules specific to the scenario with the template to generate a simulation program, said code modules including one or more chunks of executable computer software instructions defining one or more actions;
   a script processor, communicably coupled to said script generator and said user interface, configured to execute the simulation program including instructing said telephony driver to invoke a plurality of simulated callers and providing simulation results based on the simulation program to the user through the user interface.

8. The system of claim 7, further comprising:
   an event receiver, communicably coupled to said script processor, and configured to receive one or more feedback events and provide said feedback events to said script processor.

9. The system of claim 8, wherein said script processor is further configured to determine whether said feedback events affect the execution of the simulation program and modify said simulation results based on the determination.

10. The system of claim 7, wherein said code modules include computer-executable instructions for performing pre-defined actions.

11. A non-transitory computer-readable medium for storing computer-executable instructions for automatically simulating calling scenarios, the computer-readable medium comprising logic instructions that, if executed:
    (a) receive, from a user, information relating to a call center scenario to be simulated, the call center being configured to handle telephone calls from human callers;
    (b) automatically obtain at least one calling scenario template based on the information;
    (c) automatically merge code modules specific to the scenario with the template to generate a simulation program, said code modules including one or more chunks of executable computer software instructions defining one or more actions;
    (d) execute the simulation program; and
    (e) provide simulation results based on the simulation program to the user.

12. The computer-readable medium of claim 11, wherein said template is pre-existing.

13. The computer-readable medium of claim 11, wherein said template corresponds to said scenario.

14. The computer-readable medium of claim 11, further comprising logic instructions that, when executed:
    receive one or more feedback events;
    determine whether said feedback events affect the execution of the simulation program; and
    modify said simulation results based on said determining.

15. The computer-readable medium of claim 11, wherein said code modules include computer-executable instructions for performing pre-defined actions.

16. A system for automatically simulating calling scenarios, comprising:
    (a) means for receiving, from a user, information relating to a call center scenario to be simulated, the call center being configured to handle telephone calls from human callers;
    (b) means for automatically obtaining at least one calling scenario template based on the information;
    (c) means for automatically merging code modules specific to the scenario with the template to generate a simulation program, said code modules including one or more chunks of executable computer software instructions defining one or more actions;
    (d) means for executing the simulation program; and
    (e) means for providing simulation results based on the simulation program to the user.

* * * * *